United States Patent Office 3,781,369
Patented Dec. 25, 1973

3,781,369
SUBSTITUTED HALOALKOXY PHENOLS
Eric R. Larsen, Midland, Bernard R. Andrejewski, Linwood, and Fred Y. Edamura, Midland, Mich., assignors to The Dow Chemical Company, Midland, Mich.
No Drawing. Filed Feb. 1, 1971, Ser. No. 111,683
Int. Cl. C07c *43/22*
U.S. Cl. 260—613 D    9 Claims

ABSTRACT OF THE DISCLOSURE

Novel substituted haloalkoxy- or haloalkylthio-phenol or thiophenol compounds corresponding to the formula:

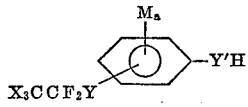

wherein
Each X independently represents hydrogen, bromo, chloro or fluoro, with the proviso that at least one X is always bromo, chloro or fluoro;
Y and Y' each independently represent oxygen or sulfur;
Each M independently represents bromo, chloro, fluoro, iodo, nitro or loweralkyl containing from 1 to about 4 carbon atoms, both inclusive, and
$a$ represents an integer of from 1 to 3, both inclusive.
The novel compounds of the present invention are suitable for use as herbicides, fungicides and insecticides, and are further useful as intermediates in the preparation of substituted ethyl phenoxyacetate compounds, which in turn have utility as herbicides.

BACKGROUND OF THE INVENTION

Various unsubstituted haloalkoxyphenol compounds, none of which anticipate or render obvious the compounds of the present invention, are disclosed in the literature. See Lichtenberger et al., Bull. Soc. Chim. Fr., 4, 581–592 (1957); Netherlands patent application No. 6607921 (1966), and Sheppard, JACS, 85, 1314 (1963).

SUMMARY OF THE INVENTION

The present invention is directed to a novel series of substituted haloalkoxy- and haloalkylthio-phenol and thiophenol compounds corresponding to the formula:

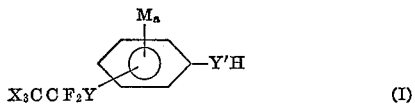

wherein
Each X independently represents hydrogen, bromo, chloro or fluoro, with the proviso that at least one X is always bromo, chloro or fluoro;
Y and Y' each independently represent oxygen or sulfur;
Each M independently represents bromo, chloro, fluoro, iodo, nitro or loweralkyl containing from 1 to about 4 carbon atoms, both inclusive, and
$a$ represents an integer of from 1 to 3, both inclusive.
As used herein, the term "loweralkyl" means saturated, monovalent aliphatic radicals, including straight and branched-chain radicals of from 1 to about 4 carbon atoms, as illustrated by, but not limited to, methyl, ethyl, propyl, isopropyl, butyl, sec.-butyl and the like.
The products of the present invention are oils or crystalline solids at room temperatures, of low solubility in water and of varying degrees of solubility in many common organic solvents, such as, for example, carbon tetrachloride, acetonitrile, hexane and the like. The compounds of the present invention are useful as herbicides, fungicides and insecticides, and are further useful as intermediates in the preparation of substituted ethyl phenoxyacetate compounds, which in turn have utility as herbicides.

The novel compounds of the present invention, wherein M represents bromo, chloro, fluoro, iodo or nitro, are prepared by the halogenation or nitration of a selected haloalkoxy- or haloalkylthio- phenol or thiophenol compound of the formula:

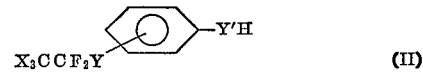

wherein X, Y and Y' are as previously defined.
Representative halogenating agents operable in the present invention include $Br_2$, $Cl_2$, and $I_2$ while operable nitrating agents include concentrated nitric acid, sodium nitrate and the like.
The contacting of the appropriate halogenating or nitrating agent with the phenol or thiophenol reactant of Formula II is conveniently carried out in the presence of an inert carrier as a reaction medium. Representative and suitable inert carriers which can be employed as reaction media include carbon tetrachloride, methylene chloride, water, ethanol, acetone and the like. In order to decrease reaction time, a small amount of an actuating agent, e.g., ferric chloride, aluminum chloride, iodine and the like, can be incorporated into the reaction mixture. The halogenating or nitrating agents are ordinarily contacted with the phenol or thiophenol reactant in a reaction medium as described at a temperature of from about 0 to about 60° C. Temperatures of from about 0 to about 10° C. are preferred, however, when conducting halogenation reactions. The pressure employed is not critical and the reactions are usually carried out under ambient atmospheric pressure.
In carrying out the halogenation or nitration reactions, the phenol or thiophenol reactant of Formula II and actuating agent are usually dispersed in a reaction medium as described and the selected halogenating or nitrating agent introduced therein with agitation over a period of from about 10 minutes to about 3 hours. In certain of the nitration reactions, the phenol reactant is alternatively added, usually dropwise, to a solution containing the nitrating agent.
After the introduction of the desired halogenating or nitrating agent, or, alternatively, the phenol reactant, is complete, the desired product can be obtained from the reaction mixture in conventional procedures. In many instances, however, the reaction mixture is further agitated for an additional period of from about 1 to about 18 hours in order to assure substantial completion of the reaction. Following the completion of the reaction, the reaction mixture is filtered, washed with water, dilute hydrochloric acid or the like, and dried. The carrier medium is removed from the reaction mixture by evaporation under reduced pressure and the product recovered as a solid or liquid residue. The product residue thus obtained can be further purified according to conventional techniques such as recrystallization, solvent extraction, fractional distillation and the like.
In a further embodiment of the present invention the novel compounds wherein M is loweralkyl are prepared by the reaction of a selected loweralkyl substituted catechol, resorcinol or hydroquinone compound with a difluoroethylene compound of the formula:

$$X_2C=CF_2 \qquad (III)$$

and potassium hydroxide.
In the above formulas, X represents hydrogen, bromo, chloro or fluoro with the proviso that at least one X is always bromo, chloro or fluoro, and loweralkyl is as previously defined. The reaction is conveniently carried out in the presence of an inert carrier as a reaction medium, such as, for example, one of those hereinbefore defined, at a temperature of from about 0 to about 30° C. Preferably, the reaction is conducted at a temperature of from about 0 to about 10° C.

In carrying out the reaction, the selected loweralkyl substituted reactant is dispersed in a reaction medium as described and the resulting dispersion purged with an inert gas, such as, for example, nitrogen and the like. The potassium hydroxide reactant is added and the mixture again purged prior to the addition of the difluoroethylene reactant of Formula III. The difluoroethylene reactant addition is carried out with agitation over a period of from about one-half to about 2 hours; the rate of addition is preferably regulated so as to maintain the reaction temperature in the preferred range. After the addition of the difluoroethylene reactant is complete, the reaction mixture is agitated for a period of from about 2 to about 4 hours in order to assure substantial completion of the reaction. Following the completion of the reaction, the reaction mixture is filtered and the carrier medium removed by evaporation under reduced pressure. The viscous residue thus obtained is extracted with an alkali solution, such as, for example, potassium hydroxide. The extract is then acidified and washed with water. The product thus obtained can be purified and further halogenated or nitrated according to the procedures previously described.

The desirable properties of the products of the present invention are inherent in the pure compounds; when highly selective properties are to be relied upon, the purified compounds will be preferred. However, for many applications, incompletely purified products can be employed if desired.

DESCRIPTION OF THE PREFERRED EMBODIMENTS

The following examples illustrate the invention but are not to be construed as limiting the same.

Example 1

Chlorine (21.0 grams; 0.30 mole) was sparged into a solution of 4 - (2,2-dichloro-1,1-difluoroethoxy)phenol (73.0 grams; 0.3 mole) and ferric chloride (approximately 0.1 gram) in 500 milliliters of carbon tetrachloride. The chlorine addition was carried out over a period of about 30 minutes at a temperature of from about 0 to about 10° C. Following the completion of the chlorine addition, the reaction mixture was washed twice with dilute hydrochloric acid and once with water, dried over magnesium sulfate, and evaporated under reduced pressure to remove the carbon tetrachloride solvent. The oily residue thus obtained was dissolved in carbon tetrachloride and cooled to a temperature of about minus 10° C. to precipitate the desired product. Filtration of the solution gave the desired 2-chloro-4-(2,2-dichloro-1,1-difluoroethoxy) phenol product as a crystalline solid. Elemental analysis calculated for $C_8H_5Cl_3F_2O_2$ (percent): C, 34.6; H, 1.81; Cl, 38.3. Found (percent): C, 33.0; H, 2.0; Cl, 38.4.

Example 2

Chlorine (91.0 grams; 1.28 moles) was sparged into a solution of 3-(2,2 - dichloro-1,1-difluoroethoxy)phenol (423 grams; 1.7 moles) and aluminum chloride (approximately 0.2 gram) in 1000 milliliters of carbon tetrachloride. The chlorine addition was carried out over a period of about two hours at a temperature of from about 0 to about 10° C. Following the completion of the chlorine addition, the reaction mixture was treated as in Example 1 above to obtain the desired product as a residual oil. Fractional distillation of the residual oil thus obtained gave the desired 2-chloro-5-(2,2-dichloro-1,1-difluoroethoxy)phenol as a yellow oil having a boiling point of 96–99° C. at 0.3 millimeter of Hg.

Example 3

Chlorine (2.3 grams; 0.03 mole) was sparged into a solution of 2 - (2,2-dichloro-1,1-difluoroethoxy)phenol (10.0 grams; 0.04 mole) and ferric chloride (approximately 0.1 gram) in 100 milliliters of carbon tetrachloride. The chlorine addition was carried out over a period of about 12 minutes at a temperature of from 0 to about 10° C. Following the chlorine addition, the reaction mixture was stirred for one and one-half hours at a temperature of from 0 to 5° C. and for an additional one and one-half hours at room temperature. The reaction mixture was then treated as in Example 2 to obtain the desired 4-chloro-2-(2,2-dichloro-1,1-difluoroethoxy)phenol product as a yellow oil having a boiling point of 59–62° C. at 0.07 millimeter of Hg.

Example 4

Chlorine (180.0 grams; 1.1 moles) was sparged into a solution of 4 - (2,2 - dichloro-1,1-difluoroethoxy)phenol (25.0 grams; 0.1 mole), aluminum chloride (approximately 0.2 gram) and iodine (approximately 0.1 gram) in 500 milliliters of carbon tetrachloride. The first 80 grams of chlorine were sparged into the solution over a period of about 2 hours at a temperature of about 24° C. The last 100 grams of chlorine were sparged into the solution at the boiling point of the solution under reflux over a period of about 4 hours. Following the chlorine addition, the reaction mixture was treated as in Example 1 to obtain the desired 2,6-dichloro-4-(2,2-dichloro-1,1-difluoroethoxy)phenol product as a crystalline solid melting at 59–60° C. Elemental analysis calculated for $C_8H_4Cl_4F_2O_2$ (percent): C, 30.8; H, 1.28; Cl, 45.8. Found (percent): C, 30.5; H, 1.31; Cl, 45.6.

Example 5

Chlorine (90.0 grams; 1.2 moles) was sparged into a solution of 3 - (2,2-dichloro-1,1-difluoroethoxy)phenol (63.0 grams; 0.26 mole) and aluminum chloride (approximately 0.1 gram) in 450 milliliters of carbon tetrachloride. The chlorine addition was carried out over a period of about 2 hours at a temperature of from about 0 to about 10° C. Following the completion of the chlorine addition, the reaction mixture was agitated at room temperature, for an additional 16 hours. The reaction mixture was then treated as in Example 1 to obtain the desired 2,4,6-trichloro-3-(2,2-dichloro-1,1-difluoroethoxy) phenol product as a crystalline solid melting at 79–82° C.

Example 6

Bromine (59.0 grams; 0.37 mole) was added dropwise to 3 - (2,2 - dichloro - 1,1 - difluoroethoxy)phenol (100.0 grams; 0.41 mole) over a period of about 50 minutes at room temperature. During the bromine addition the temperautre of the reaction mixture rose to 34° C. Following the bromine addition, the reaction mixture was successively agitated at room temperature for a period of about 16 hours, washed twice with cold water and dissolved in a 5% aqueous potassium hydroxide solution. The resulting basic solution was extracted with carbon tetrachloride and the aqueous phase separated. Acidification of the aqueous phase with dilute hydrochloric acid to a pH of about 9.0 resulted in the formation of an oily layer. The oily layer was separated and fractionally distilled to obtain the desired 2 - bromo - 5 - (2,2-dichloro-1,1-difluoroethoxy) phenol product as an oil having a boiling point of 115–129° C. at 0.4 millimeter of Hg.

Example 7

Bromine (16.8 grams; 0.10 mole) was added dropwise over a period of about 15 minutes to a solution of 4-(2,2-dichloro-1,1-difluoroethoxy)phenol (12.2 grams; 0.05 mole) in 100 milliliters of 70% ethanol. Following the completion of the bromine addition, the reaction mixture was agitated at room temperature for a period of about two and one-half hours. Upon the completion of the reaction, the reaction mixture was evaporated under reduced pressure to obtain the product as a solid residue. The product residue thus obtained was washed with water and recrystallized from hexane to give the desired 2,6-dibromo-4-(2,2-dichloro-1,1-difluoroethoxy)phenol product as a white crystalline solid melting at 55–56° C.

Example 8

4-(2,2-dichloro-1,1-difluoroethoxy)phenol (12.2 grams; 0.05 mole) was added in small portions to a cold (10°) solution of sodium hydroxide (4.4 grams; 0.11 mole) in 50 milliliters of water. In a separate vessel, iodine (25.3 grams; 0.10 mole) was added to a solution of potassium iodide (24.9 grams; 0.15 mole) in 18 milliliters of water. The resultant iodine solution was diluted to 125 milliliters and added dropwise to the prepared phenoxide solution over a period of about 30 minutes. Two hours following the completion of the iodine addition, the reaction mixture was acidified with 10% sulfuric acid and treated with a 20% sodium bisulfite solution. The resultant product precipitate formed was filtered off and recrystallized from a 5:1 methanol-water solution to give the desired 4 - (2,2 - dichloro - 1,1 - difluoroethoxy)-2,6-diiodophenol product as a white crystalline solid melting at 54–55° C.

Example 9

Concentrated nitric acid (46.0 grams; equivalent to 0.51 mole of $HNO_3$) was added slowly over a period of about 20 minutes to a solution of 4-(2,2-dichloro-1,1-difluoroethoxy)phenol (112.0 grams; 0.46 mole) in 300 milliliters of methylene chloride. The reaction being exothermic, the reaction temperature was controlled by external cooling. Following the nitric acid addition, the reaction mixture was agitated at room temperature for a period of about 16 hours, and then mixed with cold water. The organic layer containing the desired product was separated and extracted twice with cold water. The methylene chloride was removed from the organic layer by evaporation under reduced pressure, leaving a viscous residue which was dissolved in methanol, dried over magnesium sulfate, filtered, and allowed to crystallize. The solid material thus obtained was recrystallized from a 30:1 methanol/water solution to give the desired 4-(2,2-dichloro-1,1-difluoroethoxy)-2-nitrophenol product as a crystalline solid melting at 57–59° C.

Example 10

The 2 - nitro-4-(2,2-dichloro-1,1-difluoroethoxy)phenol product of Example 9 (35.9 grams; 0.12 mole) was added in small portions over a period of about two hours, with agitation, to a solution of concentrated sulfuric acid (75 milliliters) and concentrated nitric acid (75 milliliters). The addition was carried out at a temperature of from about 40 to about 48° C. Following the addition of the nitro-phenol compound, the reaction mixture was poured onto crushed ice and the resultant aqueous mixture was extracted twice with ether and the ether extractions combined. Removal of the ether from the extracts by evaporation under reduced pressure left a solid resdiue which was recrystallized from a 1:30 water/methanol solution. As a result of these operations, there was obtained the desired 4-(2,2-dichloro-1,1-difluoroethoxy) - 2,6 - dinitrophenol product as a crystalline solid melting at 51–53° C.

Example 11

3-(2,2-dichloro-1,1-difluoroethoxy)phenol (50.0 grams; 0.21 mole) was added dropwise, with agitation, to a solution of 50 grams of 96% sulfuric acid and 30 grams of sodium nitrate in 150 milliliters of water. The addition of the phenol compound was carried out at a temperature of from about 20 to about 40° C. Following the addition of the phenol reactant, the reaction mixture was agitated at ambient temperatures for a period of about 16 hours. The reaction mixture was then extracted twice with carbon tetrachloride and the extracts were combined and dried over magnesium sulfate. The extract was distilled and the fraction boiling between 141 and 185° C. at 0.5 millimeter of Hg was collected and dissolved in an equal volume of carbon tetrachloride. The solution was cooled to about minus 10° C. and the resultant precipitate filtered off. As a result of these operations, the desired 5-(2,2-dichloro-1,1-difluoroethoxy)-2-nitrophenol product was obtained as a yellow crystalline solid melting at 85–86° C.

Example 12

4-tert.-butyl-catechol (33.24 grams; 0.2 mole) was dissolved in 250 milliliters of acetone and the resulting clear amber solution purged for about 30 minutes with nitrogen at a temperature of about 2° C. Potassium hydroxide (11.22 grams; 0.2 mole) was added with agitation and the mixture again purged with nitrogen for about 15 minutes. 1,1-dichloro-2,2-difluoroethylene (approximately 136 grams; 1.0 mole) was sparged into the mixture over a period of about 45 minutes. The rate of addition of the 1,1-dichloro-2,2-difluoroethylene reactant was regulated in order to maintain the reaction temperature between about 0 and about 5° C. Following the addition of the 1,1-dichloro-2,2-difluoroethylene, the reaction mixture was agitated at ambient temperatures for about 3 hours and then filtered. Removal of the acetone solvent in vacuo gave a dark brown viscous residue which was successively washed three times with 100 milliliter portions of a 10% potassium hydroxide solution and twice with 100 milliliter portions of water. The potassium hydroxide and water washes were combined and extracted twice with carbon tetrachloride; the carbon tetrachloride extracts thus obtained were combined and washed with water until the water wash was neutral. The aqueous wash portions were combined, chilled and acidified with dilute hydrochloric acid. The resultant dark brown oily layer formed upon acidification was separated and the aqueous layer remaining extracted three times with 100 milliliter portions of carbon tetrachloride. The carbon tetrachloride extracts were combined with the dark brown oily layer and the mixture was washed three times with water. The oily layer was then dried over magnesium sulfate, treated with activated charcoal, filtered, and evaporated under reduced pressure. Distillation of the oily layer gave a yellow oil comprising a 1:1 mixture of 4 - tert. - butyl-2-(2,2-dichloro-1,1-difluoroethoxy)phenol and 5 - tert.-butyl-2-(2,2-dichloro-1,1-difluoroethoxy)phenol having a boiling point of 96–97° C. at 0.28 millimeter of Hg.

Example 13

Resorcinol (220.0 grams; 2.0 moles) was dissolved in acetone (1 liter) and potassium hydroxide (33.0 grams; 0.59 mole) was added with agitation. The resulting reaction mixture was cooled to below 5° C. and bromotrifluoroethylene (161.0 grams; 1.0 mole) was sparged into the reaction mixture over a period of about 2 hours, the rate of addition being regulated in order to maintain the reaction temperature between about 0 and about 5° C. Following the addition of the bromotrifluoroethylene reactant, the reaction mixture was stirred at ambient temperatures for about 14 hours and then filtered. Removal of the acetone solvent in vacuo gave an oily residue which was dissolved in 10% aqueous potassium hydroxide. The insoluble bis-ether by-product thus formed was filtered off and the aqueous solution acidified with dilute hydrochloric acid and extracted with carbon tetrachloride. Distillation of the extract gave the desired 3-(2-bromo-1,1,2-trifluoroethoxy)phenol product as a clear liquid having a boiling point of 95–98° C. at 0.2 millimeter of Hg.

In view of the foregoing teachings and examples, the following substituted haloalkoxy- and haloalkylthio- phenol and thiophenol compounds are prepared by halogenating or nitrating the corresponding haloalkoxy- and haloalkylthio- phenol or thiophenol and the loweralkyl-substituted haloalkoxy- and haloalkylthio- phenol or thiophenol reactants.

TABLE I

| Example number | Name of product | Identifying characteristic of product |
|---|---|---|
| 14 | 4-chloro-2-(2,2-dichloro-1,1-difluoroethoxy)phenol.[1] | B.P., 72-75° C. at 0.15 mm. Hg. |
| 15 | 6-(and 2-)-(2,2-dichloro-1,1-difluoroethoxy)-m(and -p)cresol.[2] | B.P., 74-76° C. at 0.2 mm. Hg. |
| 16 | 2,4,6-trichloro-3-(2-bromo-1,1,2-trifluoroethylthio)thiophenol. | M.W., 406.50. |
| 17 | 3,5-dichloro-2-(2,2,2-trichloro-1,1-difluoroethoxy)thiophenol. | M.W., 324.064. |
| 18 | 2,4,6-tribromo-3-(2-bromo-2-chloro-1,1-difluoroethoxy)thiophenol. | M.W., 540.26. |
| 19 | 3,5-dibromo-2-(2-bromo-1,1,2-trifluoroethoxy)thiophenol. | M.W., 444.906. |
| 20 | 2-(2,2-dichloro-1,1-difluoroethoxy)-3,5-diiodophenol. | M.W., 494.832. |
| 21 | 3-(2-bromo-1,1,2-trifluoroethylthio)-2,4,6-triiodothiophenol. | M.W., 680.858. |
| 22 | 3-(2-bromo-1,1,2-trifluoroethoxy)-2,4,6-trinitrophenol. | M.W., 406.032. |
| 23 | 2-(2,2,2-trichloro-1,1-difluoroethylthio)-3,5-dinitrophenol. | M.W., 383.543. |
| 24 | 3-(2,2-dichloro-1,1-difluoroethoxy)-2,4,6-trifluorophenol. | M.W., 297.010. |
| 25 | 4-(2-bromo-1,1,2-trifluoroethylthio)-2,6-difluorothiophenol. | M.W., 339.150. |
| 26 | 2-(2,2,2-trichloro-1,1-difluoroethoxy)-3,5-difluorophenol. | M.W., 313.465. |
| 27 | 2-(2,2-dichloro-1,1-difluoroethoxy)-3,5-di-n-propylphenol | M.W., 327.201. |
| 28 | 3-(2-bromo-1,1,2-trifluoroethoxy)-2,4,6-triethylphenol. | M.W., 355.102. |
| 29 | 4-(2,2,2-tribromo-1,1-difluoroethoxy)-2,6-di-tert.-butylphenol. | M.W., 523.068. |
| 30 | 3-bromo-2-(2,2-dichloro-1,1-difluoroethylthio)-5-fluorophenol. | M.W., 355.994. |
| 31 | 2-bromo-1,1,2-trifluoroethoxy)-3-nitro-5-tert.-butylphenol. | M.W., 372.147. |
| 32 | 3-bromo-2-(2,2-dichloro-1,1-difluoroethylthio)-5-nitrophenol. | M.W., 383.002. |
| 33 | 2-(2,2,2-trichloro-1,1-difluoroethoxy)-3-fluoro-5-n-propylphenol. | M.W., 337.556. |
| 34 | 2-chloro-3-(2,2-dichloro-1,1-difluoroethoxy)-5-tert.-butylphenol. | M.W., 333.593. |
| 35 | 4-(2-bromo-1,1,2-trifluoroethoxy)-2-iodo-6-ethylphenol. | M.W., 424.990. |
| 36 | 2,4-dichloro-3-(2-bromo-1,1,2-trifluoroethylthio)-6-fluorophenol. | M.W., 373.986. |
| 37 | 2-bromo-3-(2,2-dichloro-1,1-difluoroethoxy)-5,6-diethylphenol. | M.W., 378.049. |
| 38 | 2-(2,2-dibromo-1,1-difluoroethoxy)-4,5-diethyl-6-nitrophenol. | M.W., 433.058. |
| 39 | 2-chloro-3-(2,2-dichloro-1,1-difluoroethoxy)-4-tert.-butyl-6-nitrophenol. | M.W., 378.591. |
| 40 | 4-chloro-3-(2,2-dichloro-1,1-difluoroethoxy)-2,6-dinitrophenol. | M.W., 367.478. |

[1] Admixture with 20% 6-chloro-2-(2,2-dichloro-1,1-difluoroethoxy)phenol.
[2] 1:1 mixture of isomers.
NOTE.—B.P.=Boiling point; M.W.=Molecular weight.

The products of the present invention are suitable for use as herbicides, fungicides and insecticides. For such uses, the unmodified substance can be utilized. However, the present invention also embraces the use of compounds in a formulation. Thus, for example, a compound can be dispersed on a finely divided solid and employed therein as a dust. Also, the compounds, or a solid composition comprising the compound, can be dispersed in water, typically with the aid of a wetting agent, and the resulting aqueous suspension employed as a spray. In other procedures, the compound can be employed as a constituent of organic liquid compositions, oil-in-water and water-in-oil emulsions, or water dispersions, with or without the addition of wetting, dispersing, or emulsifying agents.

It is to be understood, however, that all of the compounds claimed and compositions containing them may not be equally effective at similar concentrations or against the same plants, insects or fungal organisms. The exact concentration of the toxic substituent to be employed in the treating compositions is not critical and may vary considerably provided the plant, insect or fungal organism and/or their respective habitats are contacted with an effective amount of the toxicant. The concentration of the toxicants in liquid compositions generally is from about 1.0 to about 50 percent by weight. Concentrations up to about 95 weight percent are often employed. In dusts or dry formulations, the concentration of the toxicant can be from about 1.0 to about 10 weight percent; however, concentrations up to about 95 weight percent are often conveniently employed. In compositions to be employed as concentrates, the toxicant can be present in a concentration of from about 5 to about 98 weight percent.

In representative operations, numerous compositions containing 500 parts of one of the compounds of the present invention as sole toxicant per million parts by weight of ultimate treating composition were prepared and separately applied to the environments containing and supporting thriving members of one of a variety of fungal organisms. The results of the evaluations of the compounds treated at the above concentration and the percent control of the organisms treated are set forth in the following Table II.

TABLE II

| Compound number | Subject compound | Percent control and kill of— | | | | | | | | | |
|---|---|---|---|---|---|---|---|---|---|---|---|
| | | S.a. | C.a. | T.m. | B.s. | A.t. | C.p. | P.p. | M.p. | R.n. | C.f. |
| 1 | 2-chloro-5-(2,2-dichloro-1,1-difluoroethoxy)phenol | 0 | 100 | 100 | | | | | | | |
| 2 | 2,4,6-trichloro-3-(2,2-dichloro-1,1-difluoroethoxy)phenol. | 0 | 100 | 100 | | | | | | | |
| 3 | 2,6-dibromo-4-(2,2-dichloro-1,1-difluoroethoxy)phenol | 100 | 100 | 100 | 100 | 100 | 100 | 100 | 100 | 100 | 100 |
| 4 | 4-(2,2-dichloro-1,1-difluoroethoxy)-2,6-diiodophenol | 100 | 100 | 100 | 100 | 100 | 100 | 100 | 100 | 100 | 100 |
| 5 | 4-(2,2-dichloro-1,1-difluoroethoxy)-2,6-dinitrophenol | 100 | 0 | 100 | 100 | 50 | 0 | 0 | 100 | 100 | 50 |
| 6 | 4-(2,2-dichloro-1,1-difluoroethoxy)-2-nitrophenol | 100 | 100 | 100 | 100 | 100 | 100 | 100 | 100 | 100 | 100 |
| 7 | 4(and 5)-tert.-butyl-2-(2,2-dichloro-1,1-difluoroethoxy)phenol.[1] | 100 | 100 | 100 | 100 | 100 | 100 | 100 | 100 | 100 | 0 |
| 8 | 6(and 2)-(2,2-dichloro-1,1-difluoroethoxy)-m(and -p)cresl.[1] | 100 | 100 | 100 | 100 | 100 | 100 | 100 | 100 | 100 | 100 |
| 9 | 4-chloro-2-(2,2-dichloro-1,1-difluoroethoxy)phenol [2] | 100 | 100 | 100 | 100 | 100 | 100 | 100 | 100 | 100 | 100 |

[1] 1:1 mixture of isomers.
[2] Admixture with 20% 6-chloro-2-(2,2-dichloro-1,1-difluoroethoxy)phenol.

NOTE.—C.p.=Candida pelliculosa; P.p.=Pullularia pullulans; M.p.=Mycobacterium phlei; R.n.=Rhizopus nigricans; C.f.=Cephaloascus fragans; S.a.=Staphylococcus aureus; C.a.=Candida albicans; T.m.=Trichophyton mentagrophytes; B.s.=Bacillus subtilis; A.t.=Aspergillus terreus.

In further representative operations, 4-(2,2-dichloro-1,1-difluoroethoxy) - 2,6 - dinitrophenol gives complete control of Southern army worms, bollworms and two-spotted spider mites when such pests are contacted with compositions containing the above compound at a concentration of 500 parts per million by weight.

In additional representative operations, 4-(2,2-dichloro-1,1-difluoroethoxy)-2-nitrophenol gives complete control of yellow fever mosquito larva when such organisms are contacted with compositions containing the above compound at a concentration of 1.0 part per million by weight.

In other additional operations, each of the 4-(2,2-dichloro - 1,1 - difluoroethoxy)-2,6-dinitrophenol, 4-(2,2-dichloro - 1,1 - difluoroethoxy)-2,6-diiodophenol and 2,6-dibromo - 4 - (2,2 - dichloro-1,1-difluoroethoxy)phenol compounds gives complete control of pigweeds when such plants are contacted with compositions containing one of the above-named compounds at a dosage of 20 pounds per acre.

In further representative operations, each of 5-(2,2-dichloro - 1,1 - difluoroethoxy)-2-nitrophenol, 2,4,6-trichloro-3-(2,2 - dichloro - 1,1 - difluoroethoxy)phenol and 2 - chloro-5-(2,2-dichloro-1,1-difluoroethoxy)phenol compounds gives complete control of water plant (Milfoil and Cabomba) when such plants are contacted with compositions containing one of the above-named compounds at a concentration of 10 parts per million by weight.

Many of the products of the present invention are useful as intermediates in the preparation of other active biological agents. For example, 2-bromo-5-(2,2-dichloro-1,1-difluoroethoxy)phenol is employed as an intermediate in the preparation of ethyl 2-bromo-5-(2,2-dichloro-1,1-difluoroethoxy)phenoxyacetate, which in turn is useful as a herbicide.

In representative operations, ethyl 2-bromo-5-(2,2-dichloro-1,1-difluoroethoxy)phenoxyacetate gives substantially complete control of pigweeds, wild-mustard charlock, crabgrass, bindweed, beans and yellow foxtail when such plants are contacted with compositions containing the named compound at a dosage of 20 pounds per acre.

The ethyl 2-bromo-5-(2,2-dichloro-1,1-difluoroethoxy)phenoxyacetate compound is prepared by reacting 2-bromo - 5 - (2,2 - dichloro-1,1-difluoroethoxy)phenol (41.1 grams) with ethyl bromoacetate (23.6 grams) and potassium carbonate (17.5 grams) in the presence of acetonitrile (130 milliliters). The ethyl bromoacetate reactant is added to a mixture of the other reactants under ambient temperature conditions and the resulting reaction mixture is heated at the boiling temperature under reflux conditions for a period of about 20 hours. Following the completion of the reaction, the reaction mixture is cooled, filtered and evaporated under reduced pressure to obtain the desired product as an oily residue. The residue thus obtained is distilled to obtain the desired ethyl 2-bromo-5-(2,2 - dichloro - 1,1 - difluoroethoxy)phenoxyacetate product as an oil having a boiling point of 154–160° C. at 0.2 millimeter of Hg and a refractive index ($n_D^{25}$) of 1.5131.

The haloalkoxy- or haloalkylthio- phenol or thiophenol compounds employed as starting materials in the present invention can be prepared by known or analogous methods disclosed in the literature. For example, 3-(2,2-dichloro-1,1-difluoroethoxy)phenol is prepared by the reaction of resorcinol, 1,1-dichloro-2,2-difluoroethylene and sodium hydroxide in the presence of acetone. The 1,1-dichloro - 2,2 - difluoroethylene reactant is usually sparged into a mixture of the other reactants at a temperature of from about 0 to about 10° C. over a period of about two hours. Following the completion of the reaction, the solvent is removed by evaporation under reduced pressure and the residue thus obtained is dissolved in 10% aqueous potassium hydroxide and subsequently filtered. The aqueous solution is acidified with dilute hydrochloric acid, extracted with carbon tetrachloride and the extract dried over magnesium sulfate. Removal of the carbon tetrachloride solvent by distillation gives the desired 3-(2,2-dichloro-1,1-difluoroethoxy)phenol product as an oil having a boiling point of 108–109° C. at 0.2 millimeter of Hg.

The loweralkyl-substituted haloalkoxy- and haloalkylthio- phenol or thiophenol reactants are prepared in analogous procedures employing loweralkyl-substituted catechol, resorcinol or hydroquinone compounds and an appropriate substituted difluoroethylene reactant. The loweralkyl-substituted catechol, resorcinol and hydroquinone reactants and the substituted difluoroethylene reactants employed above can be prepared by known or analogous methods disclosed in the literature or readily obtained from commercial sources.

The fluoro-substituted or fluoro- and loweralkyl-substituted haloalkoxy- or haloalkylthio- phenol or thiophenol compounds employed in the halogenating and nitrating reactions above are prepared by introducing the fluorine atom into the ring prior to the preparation of the ether. These compounds are prepared from a fluoro- or a fluoro- and loweralkyl- substituted catechol, resorcinol or hydroquinone compound according to the procedures set forth in Illinois State Geological Circular #199, p. 15 (1955). Other modes of substitution are readily arrived at by the synthesis of ortho-, meta-, or para- fluoro-(2,2-dihalo-1,1-difluoroethoxy)benzene compounds from the corresponding fluorophenols followed by nitration, reduction diazatization, hydrolysis and the like.

Compounds containing the $CX_3CF_2Y$— moiety, wherein X represents bromo or chloro, are readily prepared by photochemically halogenating known compounds of the type

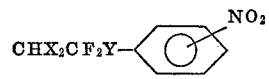

$CHX_2CF_2Y-$ (See Lichtenberger, et al., Bull., Soc. Chim. Fr., 4, 581–596 (1957) with an appropriate halogenating agent, such as, for example, $Cl_2$, ClBr and the like, in the presence of a solvent such as carbon tetrachloride or a heterogeneous mixture employing water.

The compounds wherein X is fluoro are prepared by reacting the compounds wherein X is bromo or chloro with a molten antimony fluoro-chloro compound at a temperature of from about 80–120° C. for a period of from about ½ to about 2 hours.

The resulting halo substituted compounds of the above formula are readily reduced to the corresponding anilines with various reducing agents, such as, for example, zinc-hydrochloric acid, hydrogen-Raney nickel, and the like. The anilines are then reacted with sodium nitrite to form diazonium salts which are readily hydrolyzed to the corresponding phenols or thiophenols.

Secondary substituents on the ring may, depending upon the resistance of the substituent to the succeeding reactions, be introduced at various points in the reaction sequence or introduced after the phenol or thiophenol is obtained.

What is claimed is:

1. Compounds corresponding to the formula:

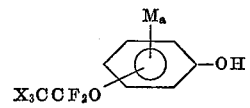

wherein
each X independently represents hydrogen, bromo, chloro or fluoro, with the proviso that at least one X is always bromo, chloro or fluoro;
each M independently represents bromo, chloro, fluoro, iodo, nitro or loweralkyl containing from 1 to about 4 carbon atoms, both inclusive, and
$a$ represents an integer of from 1 to 3, both inclusive.

2. A compound according to claim 1 which is 2-chloro-5-(2,2-dichloro-1,1-difluoroethoxy)phenol.

3. A compound according to claim 1 which is 2,4,6-trichloro-3-(2,2-dichloro-1,1-difluoroethoxy)phenol.

4. A compound according to claim 1 which is 2-bromo-5-(2,2-dichloro-1,1-difluoroethoxy)phenol.

5. A compound according to claim 1 which is 2,6-dibromo-4-(2,2-dichloro-1,1-difluoroethoxy)phenol.

6. A compound according to claim 1 which is 4-(2,2-dichoro-1,1-difluoroethoxy)-2,6-diiodophenol.

7. A compound according to claim 1 which is 4-(2,2-dichloro-1,1-difluoroethoxy)-2,6-dinitrophenol.

8. A compound according to claim 1 which is 4-(2,2-dichloro-1,1-difluoroethoxy)-2-nitrophenol.

9. A compound according to claim 1 which is 4-(2,2-dichloro-1,1-difluoroethoxy)-2-nitrophenol.

References Cited

UNITED STATES PATENTS 2,409,274  10/1946  Hanford et al. ----- 260—614 R

FOREIGN PATENTS 1,173,994  11/1958  France ---------- 260—613 D

BERNARD HELFIN, Primary Examiner

U.S. Cl. X.R.

260—609 E, 609 F, 479 R; 424—341, 337; 71—124, 98

O-1050 (5/69)

UNITED STATES PATENT OFFICE
CERTIFICATE OF CORRECTION

Patent No. 3,781,369    Dated December 25, 1973

Inventor(s) E. R. Larsen, B. R. Andrejewski and F. Y. Edamura

It is certified that error appears in the above-identified patent and that said Letters Patent are hereby corrected as shown below:

Column 4, lines 53-54, "temperautre" should read --temperature--;

Column 5, line 58, "resdiue" should read --residue--;

Column 7, Table I, Example No. 31, correct product name to read --2-(2-bromo-1,1,2-trifluoroethoxy)-3-nitro-5-tert.--butylphenol--;

Column 7, Table II, Compound No. 8, under Subject compound, correct spelling of "cresol".

Signed and sealed this 17th day of September 1974.

(SEAL)
Attest:

McCOY M. GIBSON JR.
Attesting Officer

C. MARSHALL DANN
Commissioner of Patents